Patented June 11, 1929.

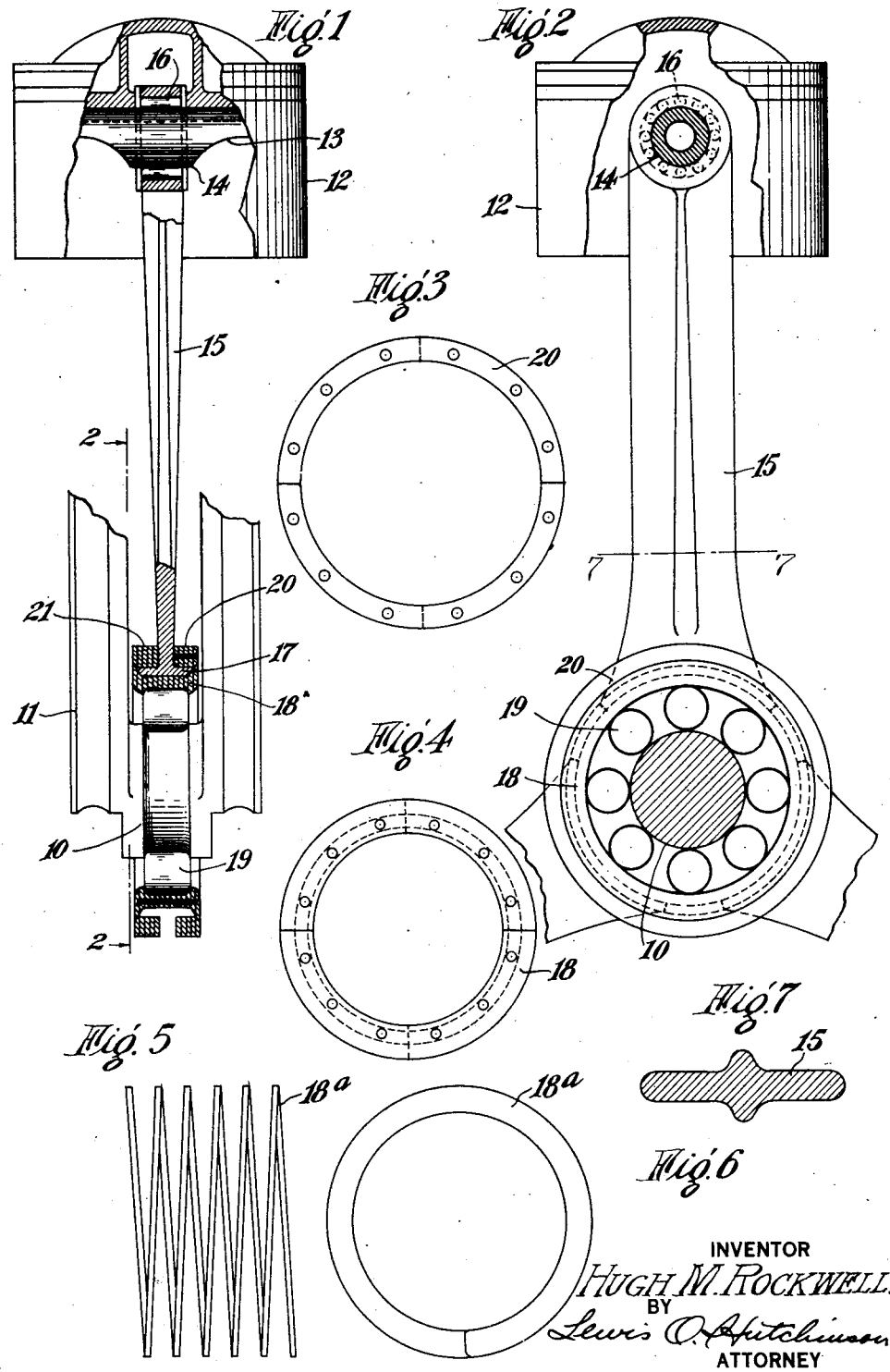

1,717,066

UNITED STATES PATENT OFFICE.

HUGH M. ROCKWELL, OF ELMHURST, NEW YORK.

INTERNAL-COMBUSTION ENGINE.

Application filed November 23, 1925. Serial No. 71,010.

This invention relates to internal combustion engines and more especially to means for connecting pitmen to the crank pins of the crank shaft.

In applicant's copending application, Ser. No. 61,076, filed October 7, 1925, there is disclosed a one piece crank shaft having cheeks of considerably larger cross-sectional area than the crank pins. An object of this invention is an anti-friction connecting rod bearing for this type of crank shaft in which the bearing surface in contact with the anti-friction members is uninterrupted through its full width at any point. By use of the anti-friction members in the connecting rod bearing, the length of the bearing surface required is lessened as compared to plain bearings, thereby reducing both the length and weight of the crank shaft.

This object is attained by constructing the bearing surface of a series of segments, the adjacent segments being oriented with respect to each other or by providing a helix which may be threaded into position and its turns riveted together. The connecting rod may be attached to the bearing surface in any desired manner but preferably by a slipper type connection as it is intended that this type of bearing shall be used to connect a plurality of connecting rods to each crank pin. The slipper head of the connecting rod is slidably held against the outer surface of the bearing by a similar ring built up of segments or comprising a helix.

Referring now to the drawings,

Fig. 1 is an elevation partly in section of a piston, connecting rod and portion of a crank shaft embodying the invention;

Fig. 2 is a section on line 2—2 of Fig. 1;

Figs. 3, 4, 5 and 6 are detail views of portions of the connecting rod bearing; and, Fig. 7 is a section on line 7—7 of Fig. 2.

10 is the crank pin of a crank shaft having cheeks 11 of greater width than the diameter of the crank pin. 12 is a piston having a wrist pin 13 on which is provided a bearing surface 14. A connecting rod 15 has an aperture in one end through which passes the pin 13, anti-friction rollers 16 being interposed between its inner surface and the surface 14. The other end of the connecting rod has formed thereon a head 17 which is commonly known as the slipper type.

A bearing member 18 having a bore, the diameter of which is less than the width of the crank shaft cheeks, surrounds the crank pin 10 and between them are interposed anti-friction members 19. The bearing member 18 preferably consists of a number of laminations each composed of a pair of semi-circular segments 20. The adjacent laminations are oriented so that the joining lines of the segments are out of line thereby providing a bearing surface uninterrupted at any point through its full width. A groove is formed in the inner surface of the member 18 to receive the anti-friction members 19 and a groove is also formed in its outer surface to receive the head 17. Rings 20 and 21 hold the head 17 in its groove and have an inclined portion in contact with the wall of the groove to maintain it in proper position. These rings 20 and 21 are constructed of laminations in the same way as the member 18. In each instance, the laminations are riveted together.

Instead of being formed of laminations. the bearing member 18 and the rings 20 and 21 may be composed of a helix 18$^a$ as shown in Figs. 5 and 6.

In making this member and rings the segments or helix are constructed from anti-friction bearing steel before it is hardened and tempered. They are then assembled, hardened, tempered, and ground, after which they are disassembled. They are later assembled on the bearing with the connecting rods and riveted together.

What is claimed is:

1. In combination, a crank shaft having a crank pin and cheeks integral therewith, a continuous bearing member surrounding said crank pin and having its bearing surface uninterrupted its full width at any point, said cheeks being wider than the diameter of the bore of said bearing member.

2. In combination, a crank shaft having a crank pin and cheeks integral therewith, a continuous bearing member surrounding said crank pin, anti-friction members interposed between said bearing member and said crank pin, said bearing member having no straight line interruption extending its full width and said cheeks being of greater cross-section than the bore of said bearing member.

3. In combination, a crank shaft having a crank pin and cheeks integral therewith, a continuous bearing member surrounding said crank pin, anti-friction members interposed between said bearing member and said crank pin, said bearing member comprising a plurality of annular members joined together to form a substantially solid annulus.

4. In combination, a crank shaft comprising a crank pin and cheeks integral therewith, a bearing member surrounding said crank pin, said bearing member comprising a plurality of annular members composed of semi-circular segments joined together to form a substantially solid annulus, the adjacent segments being oriented to locate their junction points out of alignment with each other.

5. In combination, a crank shaft having a crank pin, a continuous bearing member surrounding said pin and having a groove in its periphery, a plurality of connecting rods having heads seated in said groove and a continuous annular member at either side of said connecting rods and overlying said heads for maintaining them in said groove.

6. In combination, a crank shaft having a crank pin, a continuous bearing member surrounding said crank pin and having a groove in its periphery, a plurality of connecting rods having heads seated in said groove, a continuous annular member arranged at either side of said connecting rods and engaging said heads to maintain them in said groove, said annular members comprising a plurality of rings united together to form substantially solid annuli, each ring being oriented with respect to the adjacent ring.

7. In combination, a crank shaft having a crank pin, a continuous bearing member surrounding said crank pin, and having a peripheral groove, a connecting rod having a continuous head located in said groove and annular members at either side of said connecting rod engaging said head to hold it in position and projecting into said peripheral groove to prevent axial movement thereof.

8. In combination, a crank shaft having a crank pin, a bearing member surrounding said crank pin, and having a peripheral groove, a connecting rod having a head located in said groove and annular members at either side of said connecting rod engaging said head to hold it in position and projecting into said peripheral groove to prevent axial movement thereof, said annular members being composed of a plurality of circular members, each composed of semi-circular segments united together to form a substantially solid annulus.

9. In combination, a crank shaft having a crank pin, a bearing member surrounding said crank pin, antifriction members interposed between said bearing member and said crank pin, said bearing member having a peripheral groove, a connecting rod having a head located in said groove and annular members at either side of said connecting rod engaging said head to hold it in position and projecting into said peripheral groove to prevent axial movement thereof, said annular members being composed of a plurality of circular members, each composed of semi-circular segments united together to form a substantially solid annulus.

In testimony whereof I hereunto affix my signature this 19th of November, 1925.

HUGH M. ROCKWELL.